(12) United States Patent
Zhou et al.

(10) Patent No.: US 11,798,400 B2
(45) Date of Patent: Oct. 24, 2023

(54) HANDHELD MONITORING AND EARLY WARNING DEVICE FOR FUSARIUM HEAD BLIGHT OF IN-FIELD WHEAT AND EARLY WARNING METHOD THEREOF

(71) Applicant: Nanjing Agricultural University, Nanjing (CN)

(72) Inventors: Ji Zhou, Nanjing (CN); Jiawei Chen, Nanjing (CN); Mingxing Wen, Nanjing (CN); Xiue Wang, Nanjing (CN); Dongsheng Li, Nanjing (CN); Yanfeng Ding, Nanjing (CN)

(73) Assignee: Nanjing Agricultural University, Nanjing (CN)

( * ) Notice: Subject to any disclaimer, the term of this patent is extended or adjusted under 35 U.S.C. 154(b) by 195 days.

(21) Appl. No.: 17/356,527

(22) Filed: Jun. 24, 2021

(65) Prior Publication Data

US 2021/0407282 A1 Dec. 30, 2021

(30) Foreign Application Priority Data

Jun. 29, 2020 (CN) .......................... 202010608745.1

(51) Int. Cl.
*G08B 31/00* (2006.01)
*H04W 4/38* (2018.01)
(Continued)

(52) U.S. Cl.
CPC ............. *G08B 31/00* (2013.01); *G01D 21/02* (2013.01); *G06F 18/214* (2023.01);
(Continued)

(58) Field of Classification Search
CPC ................................................ G01N 33/56961
See application file for complete search history.

(56) References Cited

U.S. PATENT DOCUMENTS

| 6,476,856 | B1 * | 11/2002 | Zantos ............. | G08B 13/19632 |
| | | | | 348/E5.026 |
| 11,054,368 | B2 * | 7/2021 | Gold ................... | G01N 21/3563 |
| 2018/0225230 | A1 * | 8/2018 | Litichever ............... | G06F 21/82 |

OTHER PUBLICATIONS

Qiu R, Yang C, Moghimi A, Zhang M, Steffenson BJ, Hirsch CD. Detection of fusarium head blight in wheat using a deep neural network and color imaging. Remote Sensing. Nov. 13, 2019;11(22):2658. (Year: 2019).*

(Continued)

*Primary Examiner* — Clifford Hilaire
(74) *Attorney, Agent, or Firm* — Bayramoglu Law Offices LLC

(57) ABSTRACT

A handheld monitoring and early warning device for *Fusarium* head blight of in-field wheat includes an acquisition card, a processor, a camera, a touchscreen, a power supply, and a 4G network card. The acquisition card is configured to acquire data. The processor is configured to analyze the acquired data, to obtain the growth of wheat based on a deep learning algorithm. The camera is configured to acquire root, stem, and ear information of in-field wheat. The touchscreen is a medium configured to perform human-computer interaction. The power supply is configured to supply power to the monitoring and early warning device. The 4G network card is configured to perform data communication and at the same time communicate with an external cloud server. Further disclosed is an early warning method of a handheld monitoring and early warning device for *Fusarium* head blight of in-field wheat.

12 Claims, 10 Drawing Sheets

(51) Int. Cl.
*H04W 4/35* (2018.01)
*G06N 20/00* (2019.01)
*G06V 10/75* (2022.01)
*G01D 21/02* (2006.01)
*G06N 5/04* (2023.01)
*G06F 18/214* (2023.01)
*G06F 18/2411* (2023.01)
*H04N 23/62* (2023.01)
*H04N 23/695* (2023.01)
*G06N 20/10* (2019.01)

(52) U.S. Cl.
CPC ............ *G06F 18/2411* (2023.01); *G06N 5/04* (2013.01); *G06N 20/10* (2019.01); *G06V 10/76* (2022.01); *H04N 23/62* (2023.01); *H04N 23/695* (2023.01); *H04W 4/35* (2018.02); *H04W 4/38* (2018.02)

(56) References Cited

OTHER PUBLICATIONS

Bauriegel E, Giebel A, Geyer M, Schmidt U, Herppich WB. Early detection of Fusarium infection in wheat using hyper-spectral imaging. Computers and electronics in agriculture. Feb. 1, 2011;75(2):304-12. (Year: 2011).*

* cited by examiner

HANDHELD MONITORING AND EARLY WARNING DEVICE FOR FUSARIUM HEAD BLIGHT OF IN-FIELD WHEAT AND EARLY WARNING METHOD THEREOF

CROSS REFERENCE TO THE RELATED APPLICATIONS

This application is based upon and claims priority to Chinese Patent Application No. 202010608745.1, filed on Jun. 29, 2020, the entire contents of which are incorporated herein by reference.

TECHNICAL FIELD

The present invention relates to a handheld monitoring and early warning device for *Fusarium* head blight of in-field wheat and an early warning method thereof, belonging to the fields of crop phenotype monitoring and precision agriculture technologies.

BACKGROUND

In-field monitoring and early warning of *Fusarium graminearum* according to features, diseases, and climate conditions of occurrence and epidemic of *Fusarium* head blight of wheat require acquisition based on multiple places, multiple periods of time, and multivariate data (information such as images, in-field climate, and soil), acquired data is then synchronously uploaded to a cloud server through a network, and fast intelligent analysis is carried out, to implement fast prediction and warning. For temperature, rain, and light conditions during invasion and dissemination of *Fusarium* head blight, acquisition of data such as air temperature, relative humidity, sunshine, and soil humiture in the earing stage, flowering stage, and the like of wheat provides a major big data basis for the occurrence and epidemic of *Fusarium* head blight of wheat.

At present, early warning of *Fusarium* head blight of wheat is mainly implemented by using a method for deploying an environmental monitoring device. This method has relatively high costs, and requires manual export of data, which is time and labor consuming, is only applicable to wheat monitoring in a particular range, and cannot be deployed on a large scale to obtain wheat information. However, as China has a vast territory, the scale and place of outbreak of *Fusarium* head blight are uncontrollable, acquisition of environmental data and image data with a stationary device cannot effectively provide early warning for the outbreak of *Fusarium* head blight of wheat.

SUMMARY

A technical problem to be resolved by the present invention is to provides a handheld monitoring and early warning device for *Fusarium* head blight of in-field wheat and an early warning method thereof to overcome deficiencies in the prior art.

The adopted technical solution is as follows: A handheld monitoring and early warning device for *Fusarium* head blight of in-field wheat includes:

an acquisition card, configured to acquire data;

a processor, configured to analyze the acquired data, to obtain the growth and affection of wheat based on a deep learning algorithm;

a camera, configured to acquire root, stem, and ear information of in-field wheat;

a touchscreen, being a medium configured to perform human-computer interaction;

a power supply, configured to supply power to the monitoring and early warning device; and a 4G network card, configured to perform data communication and at the same time communicate with an external cloud server, where the processor is separately communicatively connected to the camera, the touchscreen, and the acquisition card, and the power supply is separately electrically connected to the camera, the touchscreen, and the acquisition card.

The handheld monitoring and early warning device for *Fusarium* head blight of in-field wheat has a small volume and is easily portable, it is not necessary to deploy monitoring devices in a large range, and monitoring and early warning can be implemented for a large-scale wheat planting region.

A further defined technical solution of the handheld monitoring and early warning device for *Fusarium* head blight of in-field wheat of the present invention is as follows:

The processor uses the Huawei HiSilicon HiKey970 single-board computer. The Huawei HiSilicon HiKey970 single-board computer is provided with a built-in Wi-Fi module to implement data communication with the 4G network card. Huawei HiKey970 is a motherboard that has a small volume, high performance, and high integration. The motherboard carries Bluetooth 4.1 and dual-band Wi-Fi, is at the same time integrated with expansion ports such as GPS, 4G, SSD, and CAN, has a size of only 100 mm*85 mm*10 mm, and can support CPU and GPU AI operation and support hardware acceleration of neural network computing based on an NPU, to meet an operation requirement and a transmission mode during data acquisition for *Fusarium* head blight of wheat.

The acquisition card includes a microcontroller unit (MCU), a start circuit, a DC-DC step-down module, an environmental monitoring sensor module, a Wi-Fi wireless transmission module, and a 2-way 485 communication interface that are integrated on a circuitry board. The environmental monitoring sensor module is connected to the MCU, and is configured to monitor various indicator data in an environment and send the data into the MCU. The start circuit and the DC-DC step-down module are both connected to the MCU. The Wi-Fi wireless transmission module is connected to the MCU and implement data communication between the MCU and the processor. The 2-way 485 communication interface is connected to the MCU.

The environmental monitoring sensor module includes a light sensor, a carbon dioxide sensor, a carbon monoxide sensor, an ozone sensor, a humiture sensor, and a $PM_5$ detection sensor. Output terminals of the light sensor, the carbon dioxide sensor, the carbon monoxide sensor, the ozone sensor, the humiture sensor, and the $PM_5$ detection sensor are all connected to the MCU.

The environmental monitoring sensor module further includes an external soil humiture sensor and soil pH value sensor that are respectively plugged in the 2-way 485 communication interface.

The camera uses an integrated industrial camera. The integrated industrial camera is rotatably connected to the monitoring and early warning device by an adjustable spiral rocker, to implement 360-degree rotation of the integrated industrial camera. The integrated industrial camera is adaptively joined to the adjustable spiral rocker by a cylindrical platform to fix a shooting angle of the integrated industrial camera. The industrial camera has high temperature resistance performance, a stable level during operation at a high temperature, and low power consumption, is energy and power saving, is suitable for being mounted on the handheld device, and can maximize the operation time during in-field work, to avoid the need for recharging.

The present invention provides an early warning method of a handheld monitoring and early warning device for *Fusarium* head blight of in-field wheat, including the following steps:

step 1: obtaining historical meteorological data in the last decade of a Jiangsu Province wheat planting region city with a wheat planting region that requires monitoring and early warning, where the historical meteorological data includes nine meteorological factors: air temperature, humidity, sunshine duration, an amount of evaporation, 5-cm soil temperature, 10-cm soil temperature, soil humiture, a soil pH value, and an air spore count;

step 2: normalizing the nine meteorological factors in step 1, to obtain the nine meteorological factors used as nine model variables, and uploading and storing the model variables in a cloud server;

step 3: acquiring data 14 days in a row by using the handheld monitoring and early warning device at 12 points randomly selected in every acre of land in the wheat planting region in the middle and last thirds of April, and shooting wheat ear pictures and at the same time obtaining meteorological data of 14 days, where the meteorological data includes seven meteorological factors: temperature, humidity, soil temperature, soil humidity, a soil pH value, illumination, and a $PM_5$ count in air;

step 4: uploading data of the wheat ear pictures acquired in step 3 and the meteorological data of 14 days to the cloud server;

step 5: detecting the number of diseased ears in the wheat ear pictures in the data of the wheat ear pictures in step 4 in the cloud server by using a deep learning target detection algorithm ConerNet, and then calculating a ratio of an affected wheat ear area to an entire ear area by using a deep learning semantic segmentation algorithm U-net, to obtain a diseased ear rate of *Fusarium* head blight of wheat, where the diseased ear rate of *Fusarium* head blight of wheat is used as one model variable;

step 6: normalizing the seven meteorological factors in the meteorological data of 14 days in step 4 in the cloud server, to obtain the seven meteorological factors as seven model variables, and storing the model variables in the cloud server;

step 7: respectively establishing three prediction models as three individual learning machines in a parallel Bagging ensemble learning manner by using a multiple regression analysis machine learning algorithm, a BP neural network machine learning algorithm, and a support vector machine (SVM) machine learning algorithm at the same time; then integrating the three prediction models to form a uniform integrated model as a bigram model of the occurrence of *Fusarium* head blight of wheat, and outputting whether wheat is affected; and respectively substituting a total of seventeen model variables in step 2, step 5, and step 6 into the three prediction models used as the individual learning machines in the bigram model, at the same time performing operation, and eventually obtaining three prediction results through hyperparameter optimization, where the prediction result includes a level of the diseased ear rate of wheat and calculation result accuracy; and classifying the level of the diseased ear rate of wheat into four grades, where wheat with a diseased ear rate of wheat being zero obtained by observing sample data is classified as grade 0, wheat with a diseased ear rate between one percent and ten percent is classified as grade 1, wheat with a diseased ear rate between ten percent and twenty percent is classified as grade 2, and wheat with a diseased ear rate greater than twenty percent is classified as grade 3; and step 8: using a result with high accuracy in the same level from the three prediction results obtained in step 7 as an optimal solution.

In the method of the present invention, multivariate data is first acquired. Preprocessing of data normalization is performed on the multivariate data. Subsequently, the affection of wheat ears is calculated by using deep learning algorithms ConerNet and U-net, to calculate a diseased wheat ear area. The two algorithms perform distinct tasks and have a progressive relationship, and can resolve the problem that the accuracy of processing in-field pictures is not high when a conventional computer vision method is used. When a relatively new deep learning algorithm is used, an affected ear count and an affected ear area can be accurately predicted. A result obtained by using the deep learning algorithm is added as one model variable to an ensemble machine learning algorithm. During the ensemble machine learning algorithm, three subalgorithms are used for calculation, to form three individual learning machines. Results are calculated respectively, an optimal solution is selected, and a result is fed back to a user. When this method is used to prevent *Fusarium* head blight of wheat, the affection of wheat can be obtained, and the user can be informed of a level of affection, for the user to take timely measures to control *Fusarium* head blight.

A further defined technical solution of the method of the present invention is as follows:

The meteorological factors are normalized, and a normalization formula that the factors follow is:

$$\bar{x}^{(j)} = \frac{x^{(j)} - \min^{(j)}}{\max^{(j)} - \min^{(j)}},$$

where j is a meteorological factor, $\bar{x}^{(j)}$ is a value corresponding to a feature j after normalization obtained through the formula, $x^{(j)}$ is a value corresponding to a feature j in a data set, and $\max^{(j)}$ and $\min^{(j)}$ are a maximum value and a minimum value of the feature j in the data set.

Step 3 is specifically: connecting an external soil humiture sensor and soil pH value sensor to the handheld device, and operating the device, where an environmental monitoring sensor module acquires meteorological data, and a touchscreen displays real-time meteorological data; and adjusting a shooting angle of a camera, shooting wheat from top to bottom at a distance of 50 cm from wheat ears, and after the shooting is completed, uploading the wheat ear pictures and the meteorological data to the cloud server via a 4G network card.

Step 5 is specifically:

step 501: marking ears in the wheat ear pictures, and randomly grouping the marked pictures at a ratio of 75% to 25%, to establish a training set and a data set;

step 502: training the marked pictures in step 501 by using the deep learning target detection algorithm ConerNet, to obtain the number of diseased ears in the wheat ear pictures; and step 503: segmenting and retrieving affected wheat grains in ears in step 502 by using the deep learning semantic segmentation algorithm U-net: first, establishing a training environment; then, changing a training file path, that is, a file path for saving wheat pictures; and finally, testing every picture, and calculating a ratio of an affected region area to an entire ear area in every picture, to obtain the diseased ear rate of *Fusarium* head blight of wheat.

Ears in the wheat ear pictures are marked in a total of two marking manners: in the first marking manner, a rectangular box is drawn to select all affected wheat ears in a picture by using the labellmg software, where position information of four corners of the rectangular box in the picture after box selection are saved in a jason format; and in the second marking manner, points are selected through clicking to mark wheat grains in affected ear regions of every wheat plant in a picture by using the labelme software, where position information of all selection points are saved in a jason format.

For the prediction model established by using the SVM machine learning algorithm in step 7, a kernel function in the prediction model uses a Gaussian kernel function. A feature matrix is inputted into an SVM prediction model. An eigenvector matrix is first built for every group of data. The built eigenvector matrix is then placed in an SVM for training. In primary classification, eigenvalue data with a diseased ear rate less than one percent, that is, normal wheat is inputted as a positive class, eigenvalue data with a diseased ear rate greater than one percent, that is, diseased wheat, is inputted as a negative class, and after the classification is completed, secondary classification is performed. In the secondary classification, diseased wheat is classified, eigenvalue data with a diseased ear rate between one percent and ten percent, that is, grade 1 wheat, is inputted as a positive class, and eigenvalue data with a diseased ear rate greater than ten percent is inputted as a negative class. By analogy, in tertiary classification, eigenvalue data with a diseased ear rate between ten percent and twenty percent, that is, grade 2 wheat, is inputted as a positive class, and eigenvalue data with a diseased ear rate greater than twenty percent, that is, grade 3 wheat, is inputted as a negative class.

Compared with the prior art, the beneficial effects of the present invention are as follows:

1. The handheld monitoring and early warning device for *Fusarium* head blight of in-field wheat has a small volume and is easily portable, it is not necessary to deploy monitoring devices in a large range, and monitoring and early warning can be implemented for a large-scale wheat planting region.

2. In the present invention, the growth and affection of wheat are obtained in a manner of using the handheld device to acquire data, the acquired data can be uploaded in real time, and integrated intelligent analysis can be performed on multi-scale in-field data in a cloud by using a multivariate algorithm, to provide a user with feedback about whether wheat is affected and a degree of affection. In addition, this device has controllable costs and a high level of integration.

3. The early warning method of *Fusarium* head blight of wheat uses the latest deep learning algorithm and machine learning algorithm to predict the affection of *Fusarium* head blight of wheat, to implement the integration of multi-cloud data. The acquired data is uploaded in real time, and data is inputted into a cloud. The level of affection is calculated by using a model, to provide the user with timey feedback, to avoid further propagation of *Fusarium* head blight.

4. The present invention can help the user to make decisions about the occurrence of *Fusarium* head blight, to avoid extensive application of chemical pesticides, reduce the use of pesticides, follow the national "pesticide and fertilizer reduction" policy, and guarantee food safety.

DETAILED DESCRIPTION OF THE EMBODIMENTS

The technical solutions of the present invention are described below in detail, but the protection scope of the present invention is not limited to the embodiments.

To make the content of the present invention clearer and more comprehensible, further description is provided below with reference to FIG. 1 to FIG. 16 and specific implementations.

To make the objectives, technical solutions, and advantages of the present invention more comprehensible, the present invention is further described below in detail with reference to the accompanying drawings and embodiments. It should be understood that the specific embodiments described herein are merely used to describe the present invention rather than limiting the present invention.

Embodiment 1

A handheld monitoring and early warning device for *Fusarium* head blight of in-field wheat provided in this embodiment includes an acquisition card, a processor, a camera 1, a touchscreen 2, a power supply, and a 4G network card. The acquisition card is configured to acquire data. The processor is configured to analyze the acquired data, to obtain the growth and affection of wheat based on a deep learning algorithm. The camera is configured to acquire root, stem, and ear information of in-field wheat. The touchscreen is a medium configured to perform human-computer interaction. The power supply is configured to supply power to the monitoring and early warning device. The 4G network card is configured to perform data communication and at the same time communicate with an external cloud server.

Figure 1:
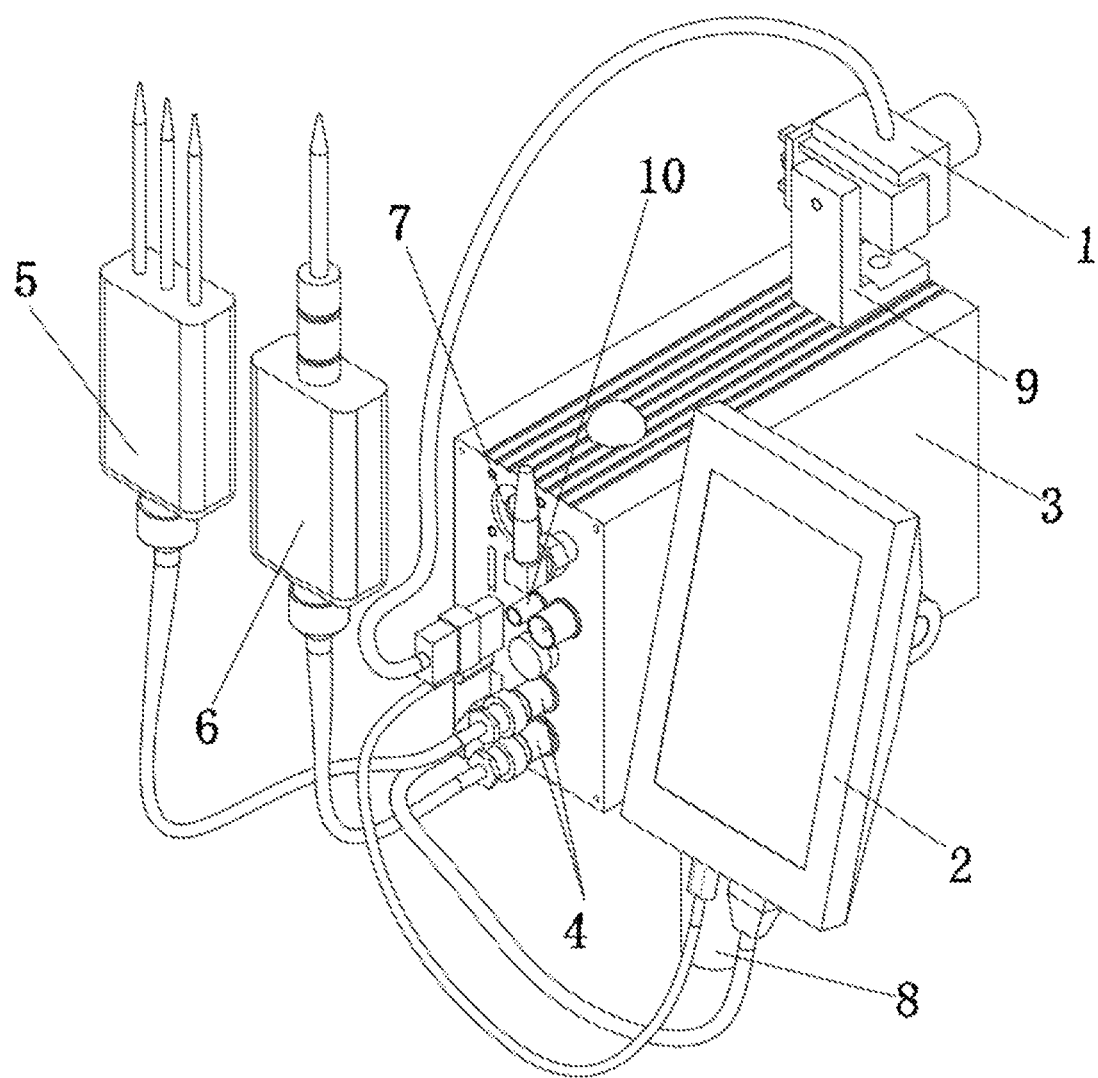
FIG. 1 is a three-dimensional appearance view of a handheld monitoring and early warning device for *Fusarium* head blight of in-field wheat according to the present invention.
Figure 2:
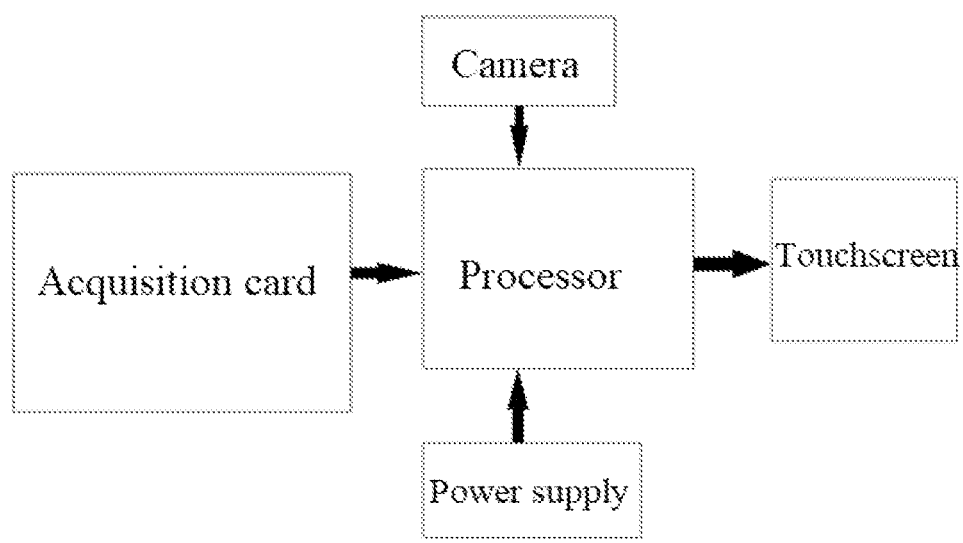
FIG. 2 is a principle block diagram of a handheld monitoring and early warning device for *Fusarium* head blight of in-field wheat according to the present invention.

As shown in FIG. 1, the acquisition card, the processor, the power supply, and the 4G network card in this embodiment are all integrated in a main body case 3. The processor is separately communicatively connected to the camera, the touchscreen, and the acquisition card. The power supply is separately electrically connected to the camera, the touchscreen, and the acquisition card.

The processor in this embodiment uses the Huawei HiSilicon HiKey970 single-board computer. The Huawei HiSilicon HiKey970 single-board computer is provided with a built-in Wi-Fi module to implement data communication with the 4G network card. The built-in Wi-Fi module in the Huawei HiSilicon HiKey970 single-board computer transmits data to the cloud server, and receives a data processing result of the cloud server.

Figure 3:
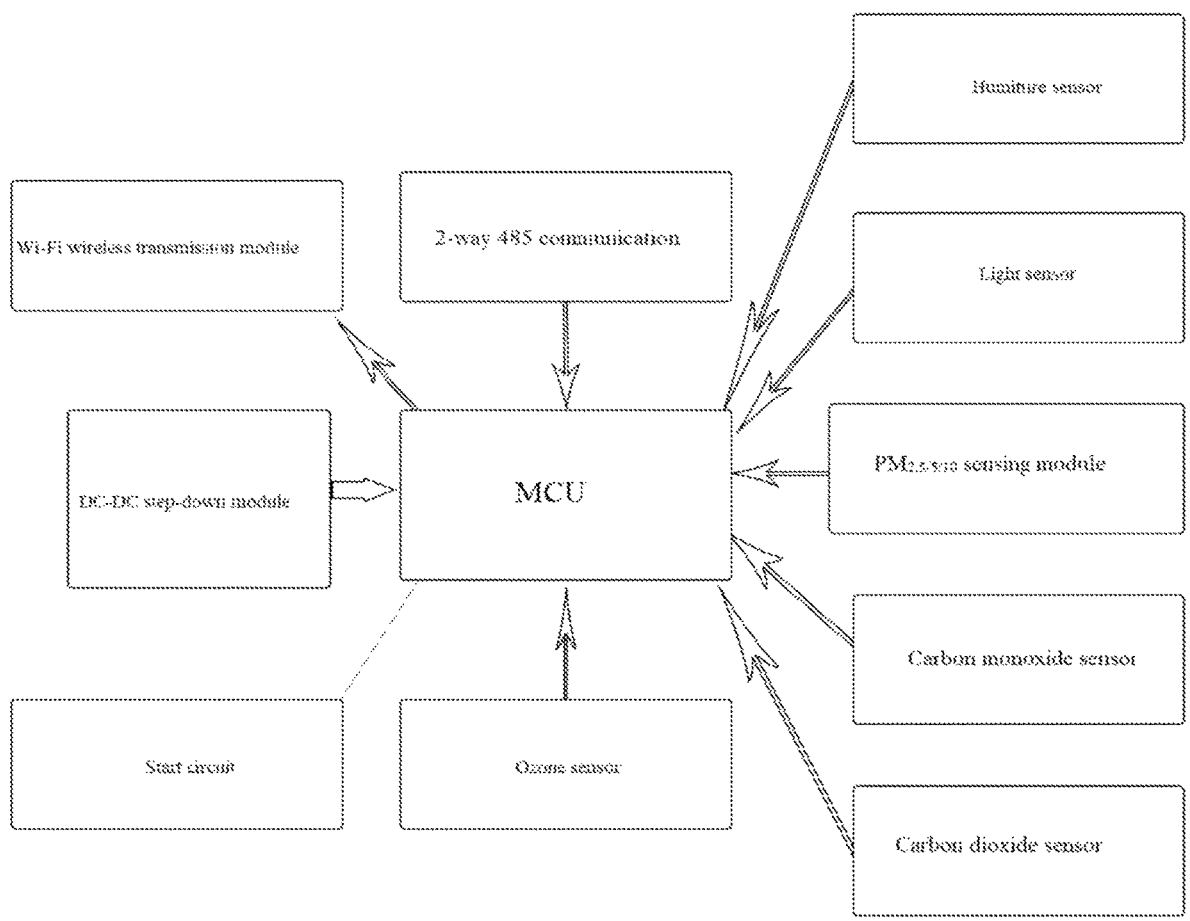
FIG. 3 is a principle block diagram of an acquisition card.

As shown in FIG. 3, the acquisition card includes an MCU, a start circuit, a DC-DC step-down module, an environmental monitoring sensor module, a Wi-Fi wireless transmission module, and a 2-way 485 communication interface that are integrated on a circuitry board. The environmental monitoring sensor module is connected to the MCU, and is configured to monitor various indicator data in an environment and send the data into the MCU. The start circuit and the DC-DC step-down module are both connected to the MCU. The Wi-Fi wireless transmission module is connected to the MCU and implement data communication between the MCU and the processor. The 2-way 485 communication interface is connected to the MCU.

The environmental monitoring sensor module includes a light sensor, a carbon dioxide sensor, a carbon monoxide sensor, an ozone sensor, a humiture sensor, and a $PM_5$ detection sensor. Output terminals of the light sensor, the carbon dioxide sensor, the carbon monoxide sensor, the ozone sensor, the humiture sensor, and the $PM_5$ detection sensor are all connected to the MCU.

As shown in FIG. 1, the environmental monitoring sensor module further includes an external soil humiture sensor 5 and soil pH value sensor 6 that are respectively plugged in a 2-way 485 communication interface 4. In this embodiment, the soil humiture sensor 5 and the soil pH value sensor 6 are both purchased parts and can be directly purchased.

A circuit of a data acquisition board in this embodiment includes an MCU module, a 2-way 485 communication module, a Wi-Fi wireless communication module, a humiture sensing module, a light acquisition interface, a $PM_{2.5/5/10}$ sensing module, a carbon monoxide concentration detection module, a carbon dioxide concentration detection module, and an ozone concentration detection module.

Figures 4, 5:
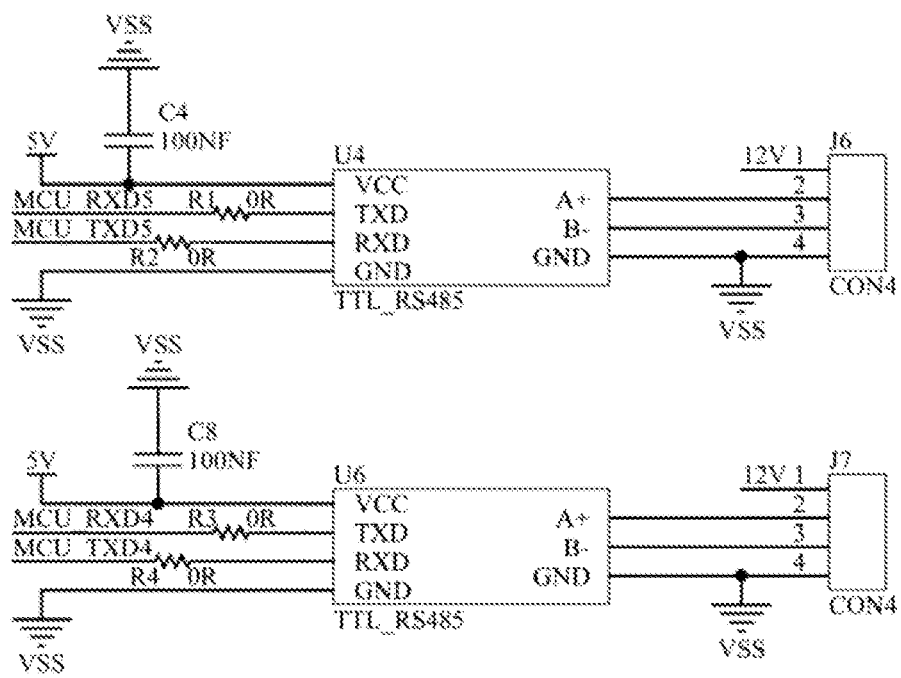
FIG. 4 is a circuit diagram of an MCU module according to this embodiment.
FIG. 5 is a circuit diagram of a 2-way 485 communication module according to this embodiment.

As shown in FIG. 4, the MCU module uses STM32F103VCT6, acquires sensor data in a manner of a serial port, AD sampling, and IIC communication.

As shown in FIG. 5, the 2-way 485 communication module is configured to communicate with a 485 soil pH value sensor and a 485 soil humiture sensor. An RS485 bus pH value sensor uses an RS485 interface and a standard MODBUS-RTU protocol, and can implement simultaneous multi-point monitoring, networking, and remote transmission. The soil humiture sensor is applicable to the measurement of soil temperature and moisture. Through comparison with a German-made high precision sensor and calibration of an actual drying and weighing method of soil, the soil humiture sensor has high precision, fast response, and a stable output. The soil humiture sensor is relatively insusceptible to salt content in soil, and is applicable to various types of soil. The soil humiture sensor can be buried in soil for a long time, can withstand long-term electrolysis and withstand corrosion, and use vacuum encapsulation, to achieve waterproofing.

Figure 6:
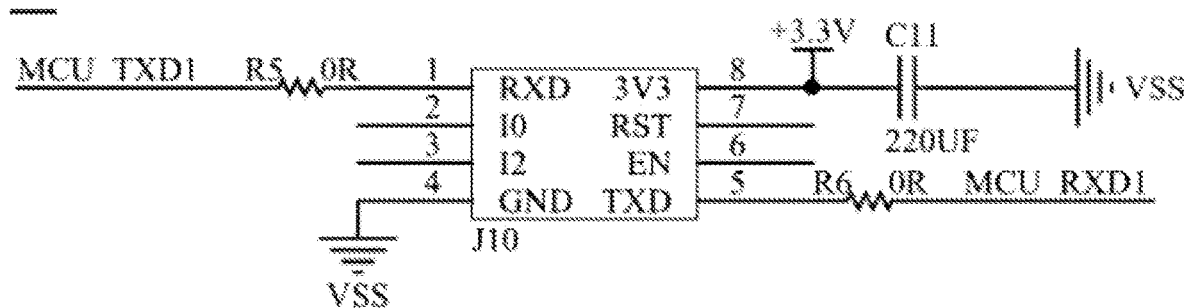
FIG. 6 is a circuit diagram of a Wi-Fi wireless communication module according to this embodiment.

As shown in FIG. 6, the Wi-Fi wireless communication module transmits, to the processor HiKey970 over an internal Wi-Fi local area network in this embodiment, data acquired and collected by the acquisition board.

Figure 7:
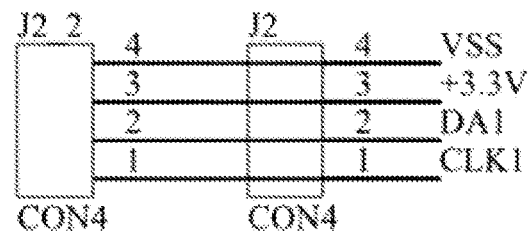
FIG. 7 is a circuit diagram of an interface of a humiture sensor according to this embodiment.

As shown in FIG. 7, the humiture sensor in this embodiment is made of French Humirel high-performance humidity sensing element, has a variety of output manners and a relatively wide operating voltage range, and at the same time has very high temperature precision and humidity precision. The humiture sensor is specially designed for low-power consumption and small-volume applications, has advantages such as adequate quality, a fast response speed, a strong anti-interference capability, a high price-performance ratio, a tiny volume, and ultralow power consumption. IIC communication is used between the humiture sensor and the MCU module.

Figure 8:
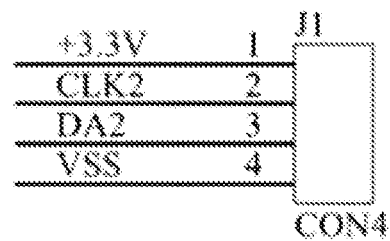
FIG. 8 is a circuit diagram of a light acquisition interface according to this embodiment.

As shown in FIG. 8, the light acquisition interface is connected to a light acquisition module, which is a measurement module for sensing light intensity. The light acquisition module provides an I2C digital output, and may be optimally applied to products such as agricultural instruments and meters and industrial sensors. The light acquisition module is an environment light sensor with a device operating current less than 0.8 mA and low power consumption. The light acquisition module has a 32-bit light value register and a 112-byte EEPROM data storage unit, and measures a light intensity value of 0 lumens to 200000 lumens.

Figure 9:
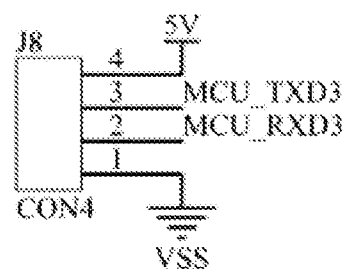
FIG. 9 is a circuit diagram of a $PM_{2.5/5/10}$ sensing module interface according to this embodiment.

As shown in FIG. 9, the $PM_{2.5/5/10}$ sensing module is a digital universal particulate matter concentration sensor based on laser scattering principle, can continuously acquire and calculate the quantities of suspended particulate matter with different particle diameters in a unit volume of air, that is, concentration distribution of particulate matter, further convert the concentration distribution into mass concentration, and output the mass concentration in the form of a universal digital interface. The sensor may be embedded in various instruments and meters or environmental improvement devices related to the concentration of suspended particulate matter in air, to provide the instruments and meters or environmental improvement devices with timely and accurate concentration data. Serial port communication is used between the $PM_{2.5/5/10}$ sensing module and the MCU module.

Figure 10:
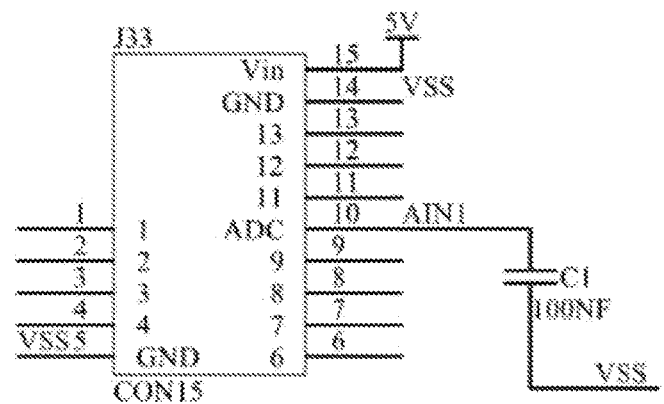
FIG. 10 is a circuit diagram of an interface of a carbon monoxide concentration detection module according to this embodiment.

As shown in FIG. 10, the carbon monoxide concentration detection module uses the electrochemical principle to detect CO that exists in air, and has adequate selectivity and stability. The built-in temperature sensor may perform temperature compensation, and provide an output to the MCU module in a manner of simulating a voltage.

Figure 11:
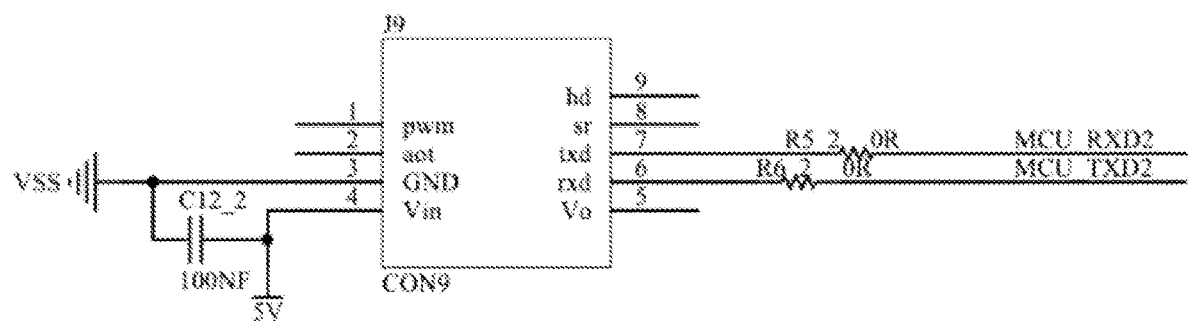
FIG. 11 is a circuit diagram of an interface of a carbon dioxide concentration detection module according to this embodiment.

As shown in FIG. 11, the carbon dioxide concentration detection module is a universal intelligent small-scale sensor, uses the nondispersive infrared (NDIR) principle to detect CO2 that exists in air, and has advantages such as excellent selectivity, and oxygen independence, and long service life. The carbon dioxide concentration detection module is provided with built-in temperature compensation. In addition, the carbon dioxide concentration detection module has a serial port output, an analog output, and a PWM output, to facilitate use. The sensor is a high performance sensor manufactured by closely combining a mature infrared absorption gas detection technology and a precise light-path design and an excellent circuit design. Serial port communication is used between the carbon dioxide concentration detection module and the MCU module.

Figure 12:
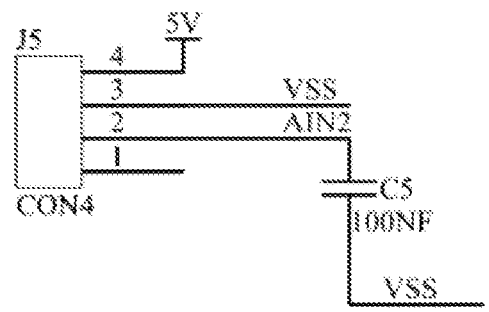
FIG. 12 is a circuit diagram of an interface of an ozone concentration detection module according to this embodiment.

As shown in FIG. 12, the ozone concentration detection module uses serial port communication. The ozone concentration detection module uses the electrochemical principle to detect ozone that exists in air and has adequate selectivity and stability. The ozone concentration detection module is provided with a built-in temperature sensor to perform temperature compensation, and provides an output to the MCU module in a manner of simulating a voltage.

Figure 13:
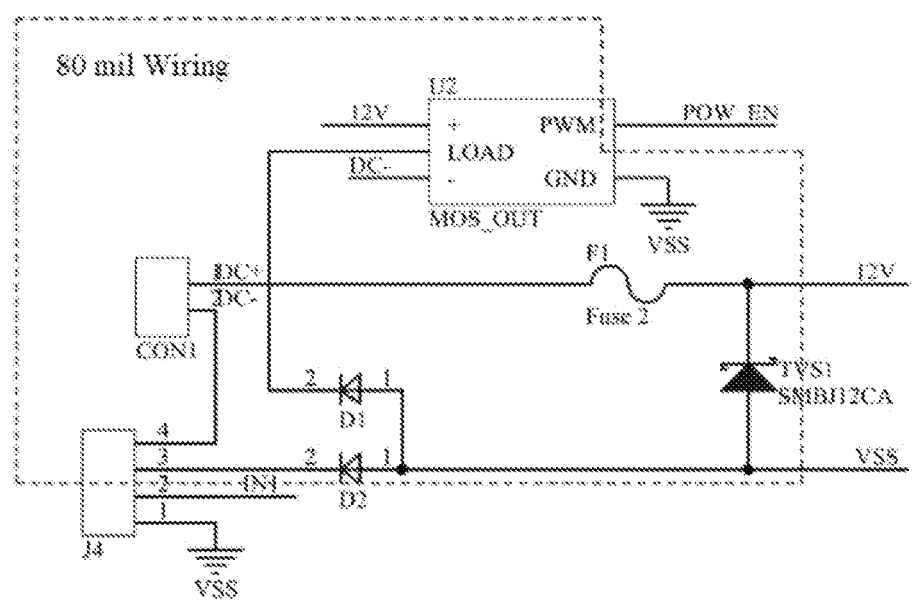
FIG. 13 is a circuit diagram of an inching switch according to this embodiment.

As shown in FIG. 13, the handheld monitoring and early warning device for Fusarium head blight of in-field wheat in this embodiment implements the function of an inching switch by using the circuit shown in FIG. 13. CON1 is an input port of a 12V direct-current power supply, U2 is a MOS electronic switch, and J4 is a 2-way inching switch. When the entire system is powered off, the inching switch J4 is closed, J4.3 and J4.4 are closed, and the entire system is powered on. The MCU on the acquisition board is powered up and started, initialized, and provides U2 with a turn-on signal, and the electronic switch U2 is turned on. When J4 is open, the electronic switch U2 is turned on, and the entire system continues to be powered on. When the entire system operates, the inching switch J4 is closed, the pin J4.2 sends a signal to the MCU on the acquisition board to instruct to turn off the system power. The MCU provides U2 with a turn-off signal. The electronic switch U2 is open, and the entire system is powered off.

Figure 14:
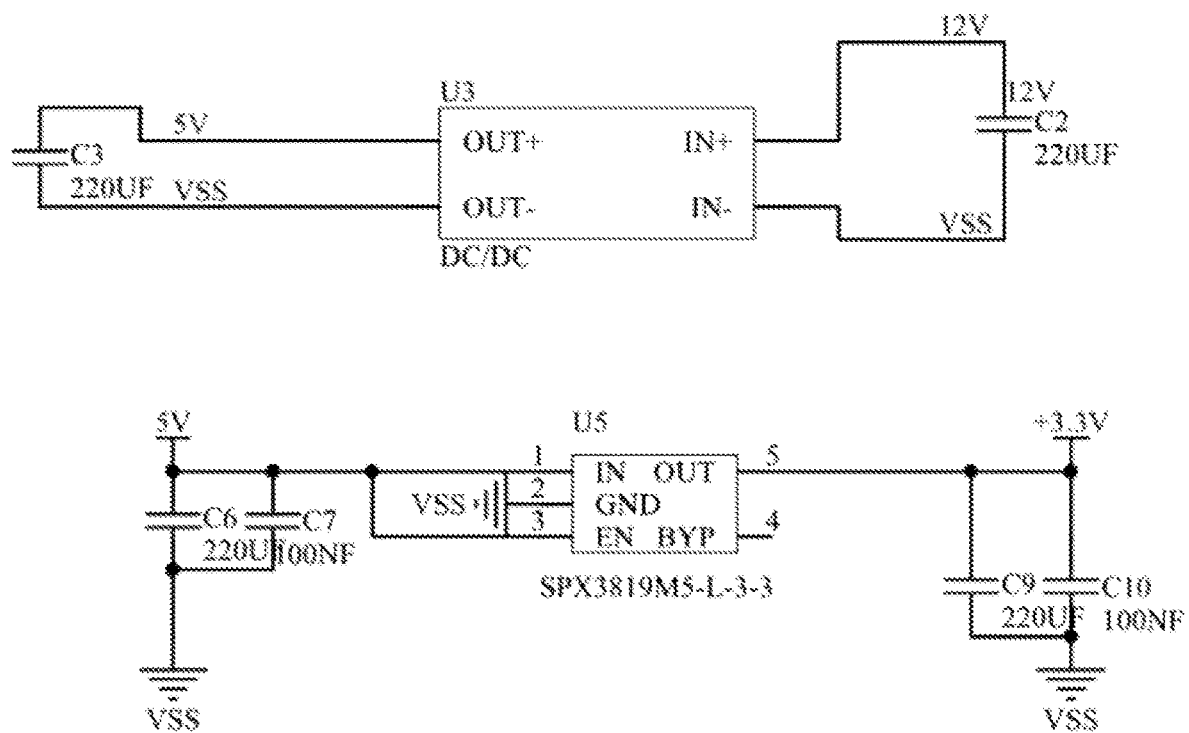
FIG. 14 is a circuit diagram of a power step-down adjustable module according to this embodiment.

As shown in FIG. 14, U3 is an MP1584EN ultra-small DC-DC 3 A power step-down adjustable module. In this embodiment, the 12V power supply is converted into a 5V power supply. U5 is a linear LDO step-down power supply and converts the 5V power supply into a 3.3V power supply.

Figure 15:
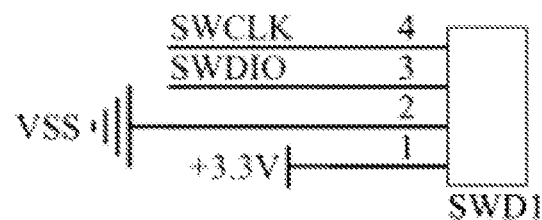
FIG. 15 is a circuit diagram of a download interface according to this embodiment.
Figure 16:
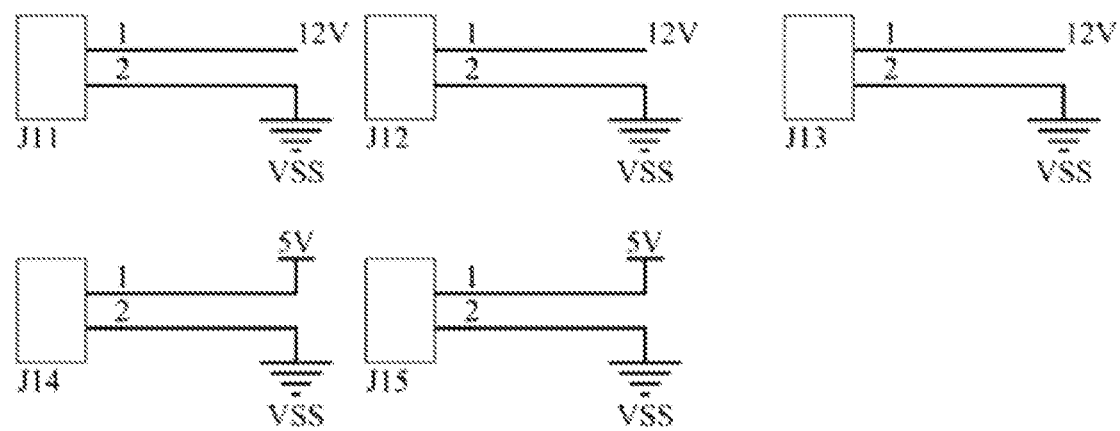
FIG. 16 is a circuit diagram of a power supply interface according to this embodiment.

The handheld monitoring and early warning device for Fusarium head blight of in-field wheat in this embodiment further includes a download interface and a power supply interface. As shown in FIG. 15, SWD is a program download port of the MCU on the acquisition board. As shown in FIG. 16, the interfaces J11, J12, and J13 can provide an output of the 12V power supply, and interfaces J14 and J15 can provide an output of the 5V power supply.

As shown in FIG. 1, a handle 8 for an operator to hold is mounted on a bottom surface of the main body case 3, and a fan 7 for heat dissipation of the inside of a case body is mounted on the main body case 3. The 2-way 485 communication interface 4 is mounted on the case body and protrudes outside the case body, for the soil humiture sensor 5 and the soil pH value sensor 6 to be plugged. The body of the touchscreen 2 is mounted on a side of the main body case 3 by a support, to facilitate observation by the operator at any time. The touchscreen 2 communicates with the processor through an HDMI cable, and at the same time the touchscreen 2 is electrically connected by a power cable to the power supply integrated inside the main body case 3.

As shown in FIG. 1, the camera 1 uses the integrated industrial camera, and preferably uses an S-YUE integrated industrial camera in this embodiment. The camera is a purchased part and can be directly purchased. The camera is rotatably mounted at the top of the main body case 3 by an adjustable spiral rocker 9, and is located at the front end, to implement 360-degree rotation of the integrated industrial camera. The integrated industrial camera is adaptively joined to the adjustable spiral rocker by a cylindrical platform to fix a shooting angle of the integrated industrial camera. The camera communicates with the processor through a USB cable.

As shown in FIG. 1, the power supply in this embodiment selects a large-capacity lithium polymer battery. The battery is further provided with an external recharging interface 10. The recharging interface 10 is mounted on a rear end panel of the main body case 3.

For the early warning method of a handheld monitoring and early warning device for Fusarium head blight of in-field wheat provided in this embodiment, a design concept is: obtaining in advance historical meteorological data in the last decade of a Jiangsu Province wheat planting region city with a wheat planting region that requires monitoring and early warning, then acquiring data 14 days in a row by using the handheld monitoring and early warning device at 12 points randomly selected in every acre of land in the wheat planting region in the middle and last thirds of April, and shooting wheat ear pictures and at the same time obtaining meteorological data of 14 days. Primary analysis is performed on inputted crop pictures by using a computer. A wheat breeding period is determined based on quantification of the growth of wheat phenotypes. A possibility of the occurrence and epidemic of Fusarium head blight is analyzed from crop growth. A possibility of the occurrence and epidemic of Fusarium head blight of wheat is determined according to sensor data related to the crop pictures. After the crop pictures and the sensor data related to the crop pictures are integrated, a possibility of the occurrence and epidemic of Fusarium head blight of wheat is analyzed according to the interaction between the crop pictures and the sensor data and historical data.

The early warning method of a handheld monitoring and early warning device for Fusarium head blight of in-field wheat in this embodiment includes the following steps:

step 1: obtaining historical meteorological data in the last decade of a Jiangsu Province wheat planting region city with a wheat planting region that requires monitoring and early warning, where the historical meteorological data includes nine meteorological factors: air temperature, humidity, sunshine duration, an amount of evaporation, 5-cm soil temperature, 10-cm soil temperature, soil humiture, a soil pH value, and an air spore count;

step 2: normalizing the nine meteorological factors in step 1, to obtain the nine meteorological factors used as nine model variables, and uploading and storing the model variables in a cloud server;

step 3: acquiring data 14 days in a row by using the handheld monitoring and early warning device at 12 points randomly selected in every acre of land in the wheat planting region in the middle and last thirds of April, and shooting wheat ear pictures and at the same time obtaining meteorological data of 14 days, where the meteorological data includes seven meteorological factors: temperature, humidity, soil temperature, soil humidity, a soil pH value, illumination, and a $PM_5$ count in air;

step 4: uploading data of the wheat ear pictures acquired in step 3 and the meteorological data of 14 days to the cloud server;

step 5: detecting the number of diseased ears in the wheat ear pictures in the data of the wheat ear pictures in step 4 in the cloud server by using a deep learning target detection algorithm ConerNet, and then calculating a ratio of an affected wheat ear area to an entire ear area by using a deep learning semantic segmentation algorithm U-net, to obtain a diseased ear rate of *Fusarium* head blight of wheat, where the diseased ear rate of *Fusarium* head blight of wheat is used as one model variable;

step 6: normalizing the seven meteorological factors in the meteorological data of 14 days in step 4 in the cloud server, to obtain the seven meteorological factors as seven model variables, and storing the model variables in the cloud server;

step 7: respectively establishing three prediction models as three individual learning machines in a parallel Bagging ensemble learning manner by using a multiple regression analysis machine learning algorithm, a BP neural network machine learning algorithm, and an SVM machine learning algorithm at the same time; then integrating the three prediction models to form a uniform integrated model as a bigram model of the occurrence of *Fusarium* head blight of wheat, and outputting whether wheat is affected; and respectively substituting a total of seventeen model variables in step 2, step 5, and step 6 into the three prediction models used as the individual learning machines in the bigram model, at the same time performing operation, and eventually obtaining three prediction results through hyperparameter optimization, where the prediction result includes a level of the diseased ear rate of wheat and calculation result accuracy; and classifying the level of the diseased ear rate of wheat into four grades, where wheat with a diseased ear rate of wheat being zero obtained by observing sample data is classified as grade 0, wheat with a diseased ear rate between one percent and ten percent is classified as grade 1, wheat with a diseased ear rate between ten percent and twenty percent is classified as grade 2, and wheat with a diseased ear rate greater than twenty percent is classified as grade 3; and step 8: using a result with high accuracy in the same level from the three prediction results obtained in step 7 as an optimal solution.

In this method, the meteorological factors are normalized, and a normalization formula that the factors follow is:

$$\bar{x}^{(j)} = \frac{x^{(j)} - \min^{(j)}}{\max^{(j)} - \min^{(j)}},$$

where j is a meteorological factor, $\bar{x}^{(j)}$ is a value corresponding to a feature j after normalization obtained through the formula, $x^{(j)}$ is a value corresponding to a feature j in a data set, and $\max^{(j)}$ and $\min^{(j)}$ are a maximum value and a minimum value of the feature j in the data set.

In this embodiment, the meteorological factors may be normalized by using the Normalizer method in the machine learning library scikit-learn. Data frames in the meteorological factors are first converted into a numpy array by using the to_numpy( ) method in Numpylibrary. The function fit( ) and the function transform( ) in the Normalizer( ) method are subsequently used to normalize all data, to enable all the data to fall within the interval [0,1], thereby improving a data read speed and stability in machine learning.

In this method, an external soil humiture sensor and soil pH value sensor are connected to the handheld device, and the device is operated. An environmental monitoring sensor module acquires meteorological data, and a touchscreen displays real-time meteorological data. A shooting angle of a camera is adjusted, wheat is shot from top to bottom at a distance of 50 cm from wheat ears, and after the shooting is completed, the wheat ear pictures and the meteorological data are uploaded to the cloud server via a 4G network card.

In this method, step 5 is specifically:

step 501: marking ears in the wheat ear pictures, and randomly grouping the marked pictures at a ratio of 75% to 25%, to establish a training set and a data set;

step 502: training the marked pictures in step 501 by using the deep learning target detection algorithm ConerNet, to obtain the number of diseased ears in the wheat ear pictures; and step 503: segmenting and retrieving affected wheat grains in ears in step 502 by using the deep learning semantic segmentation algorithm U-net: first, establishing a training environment; then, changing a training file path, that is, a file path for saving wheat pictures; and finally, testing every picture, and calculating a ratio of an affected region area to an entire ear area in every picture, to obtain the diseased ear rate of *Fusarium* head blight of wheat.

Ears in the wheat ear pictures are marked in a total of two marking manners: in the first marking manner, a rectangular box is drawn to select all affected wheat ears in a picture by using the labellmg software, where position information of four corners of the rectangular box in the picture after box selection are saved in a jason format; and in the second marking manner, points are selected through clicking to mark wheat grains in affected ear regions of every wheat plant in a picture by using the labelme software, where position information of all selection points are saved in a jason format.

In the method in this embodiment, for the prediction model established by using the SVM machine learning algorithm in step 7, a kernel function in the prediction model uses a Gaussian kernel function. A feature matrix is inputted into an SVM prediction model. An eigenvector matrix is first built for every group of data. The built eigenvector matrix is then placed in an SVM for training. In primary classification, eigenvalue data with a diseased ear rate less than one percent, that is, normal wheat is inputted as a positive class, eigenvalue data with a diseased ear rate greater than one percent, that is, diseased wheat, is inputted as a negative class, and after the classification is completed, secondary classification is performed. In the secondary classification, diseased wheat is classified, eigenvalue data with a diseased ear rate between one percent and ten percent, that is, grade 1 wheat, is inputted as a positive class, and eigenvalue data with a diseased ear rate greater than ten percent is inputted as a negative class. By analogy, in tertiary classification, eigenvalue data with a diseased ear rate between ten percent and twenty percent, that is, grade 2 wheat, is inputted as a positive class, and eigenvalue data with a diseased ear rate greater than twenty percent, that is, grade 3 wheat, is inputted as a negative class.

A prediction process of the two prediction models that are respectively established by using the BP neural network machine learning algorithm and the SVM machine learning algorithm in step 7 is similar to that of the prediction model established by using the SVM machine learning algorithm. For a training process of the case body, details are not described one by one in this embodiment.

Implementation Example 1

Winter wheat in multiple counties and cities in Jiangsu Province is selected as a research object. Historical meteorological data in March to May of 2010 to 2020 in these districts is selected. For meteorological factors, nine meteorological factors, namely, air temperature, humidity, sunshine duration, an amount of evaporation, 5-cm soil temperature, 10-cm soil temperature, soil humiture, a soil pH value, and an air spore count, are selected as independent variable factors. A diseased ear rate of *Fusarium* head blight of wheat in the same year is used as dependent variable data. Data of the selected independent variable factors in March to May is grouped according to thirds of months, to obtain a total of nine groups. Statistical analysis is performed on the relevance between seven meteorological factors including temperature, humidity, soil temperature, soil humidity, a soil pH value, illumination, and a $PM_5$ count in air and a diseased ear rate of *Fusarium* head blight in the grouped periods. Meteorological data in the same year is classified according to time and meteorological types into nine groups of a total of 54 meteorological factors, and corresponding sequence numbers are established.

Multiple regression analysis: A diseased ear rate of *Fusarium* head blight of wheat is used as a dependent variable. The remaining meteorological factors such as air temperature, humidity, sunshine duration, an amount of evaporation, 5-cm soil temperature, and 10-cm soil temperature in March to May are classified into nine groups of a total of 45 variable factors. Correlation analysis is first performed on these variable factors and data of a diseased ear rate of *Fusarium* head blight respectively, to choose variable factors with relatively high correlation coefficients. Combined analysis is then performed on two or even three variables. Average air temperature in the first third of April is positively correlated to the diseased ear rate of *Fusarium* head blight. Average sunshine duration in the last third of April and an average amount of evaporation in the last third of April are negatively correlated to the diseased ear rate of *Fusarium* head blight. The variable factors are used as independent variable factors for establishing a prediction model.

Regression analysis of a separate variable or a combination of multiple variables is performed on nine groups of a total of 54 variable factors and the dependent variable, to select average air temperature within a ten-day range from 4.1 to 4.10, average sunshine duration within a ten-day range from 4.21 to 4.30, and an average amount of evaporation within a ten-day range from 4.21 to 4.30 as independent variable factors to establish a prediction model with a diseased ear rate of *Fusarium* head blight of wheat.

Implementation Example 2

The flowering stage of wheat in Jiangsu Province mainly occurs in the middle and last thirds of April. The occurrence of *Fusarium* head blight of wheat is mainly closely related to changes in meteorological factors during the flowering stage. Air temperature, light intensity, and amounts of evaporation before and after the flowering stage have significant influence on the occurrence of *Fusarium* head blight of wheat.

BP neural network: BP neural network processing analysis is performed on the meteorological factors and data of a diseased ear rate of *Fusarium* head blight of wheat by using the python language. Research is performed to compare the quality of a neural network and the quality of multiple regression analysis modeling, to select a better model to perform monitoring and prediction on the occurrence of *Fusarium* head blight of wheat.

Before model analysis using a BP neural network, original meteorological data and data of a diseased ear rate need to be preprocessed into standardized data that can be directly used. For correlation analysis performed by using the meteorological factors, sample data such as average sunshine duration in the first third of March, average air temperature in the first third of April, average 10-cm soil temperature in the first third of April, average sunshine duration in the middle third of April, an average amount of evaporation in the middle third of April, average sunshine duration in the last third of April, and an average amount of evaporation in the last third of April in 2010 to 2020 in multiple cities and counties in Jiangsu Province is clearly correlated to the diseased ear rate. These meteorological factor variables that pass a significance test are used as influence factors that influences the occurrence of *Fusarium* head blight of wheat, that is, used as vectors of an input layer of the BP neural network. When the BP neural network uses standardized sample data, the training time can be reduced, and the convergence speed is increased, to make a prediction result more accurate. A standardization method is: standardized matrix=(initial matrix−average value matrix)/variance matrix.

According to a correlation test result of data of a diseased ear rate and meteorological factor data in multiple regression analysis, meteorological factor data that passes a correlation test is used as the input layer of the BP neural network. That is, factors such as average sunshine duration in the first third of March, average air temperature in the first third of April, average 10-cm soil temperature in the first third of April, average sunshine duration in the middle third of April, an average amount of evaporation in the middle third of April, average sunshine duration in the last third of April, and an average amount of evaporation in the last third of April are used as coefficients of the input layer. A diseased ear rate Y of *Fusarium* head blight of wheat is used as an output of the neural network. After a forward propagation process is successfully built, an error between a predicted value and an output value is obtained. A mean squared error (MSE) is used as a loss function. An automatic derivation mechanism of Tensorflow is then used to perform backward propagation. Through continuous training of the neural network, the loss function is eventually optimized to a relatively low threshold, and the threshold is set to 0.01.

Meteorological factor data in March to May is grouped according to thirds of months. A correlation test is performed on every variable and a diseased ear rate of *Fusarium* head blight of wheat. Seven pieces of data that pass the correlation test are chosen from data of tens of independent variable factors. The seven variable factors are inputted as coefficients, and sample data of the diseased ear rate is used as an output, to build a prediction model of the BP neural network.

SVM: Relationships between the diseased ear rate of *Fusarium* head blight of wheat and meteorological factors in Jiangsu Province are researched by using the python language. Experimental data is trained by using the toolkit scikit-learn, and an eventual prediction result is obtained through hyperparameter optimization.

Nine groups of sample data are obtained according to nine thirds of March to May for training. Each group of sample data includes six meteorological data factors, that is, average air temperature, humidity, sunshine duration, an amount of evaporation, 5-cm soil temperature, 10-cm soil temperature in each third of month. A kernel function in the model SVM classification uses a Gaussian kernel function. A feature matrix is inputted into the SVM. An eigenvector matrix is first built for every group of data. The built eigenvector matrix is then placed in an SVM for training. In primary classification, eigenvalue data with a diseased ear rate less than one percent, that is, normal wheat is inputted as a positive class, eigenvalue data with a diseased ear rate greater than one percent, that is, diseased wheat, is inputted as a negative class, and after the classification is completed, secondary classification is performed. In the secondary classification, diseased wheat is classified, eigenvalue data with a diseased ear rate between one percent and ten percent, that is, grade 1 wheat, is inputted as a positive class, and eigenvalue data with a diseased ear rate greater than ten percent is inputted as a negative class. By analogy, in tertiary classification, eigenvalue data with a diseased ear rate between ten percent and twenty percent, that is, grade 2 wheat, is inputted as a positive class, and eigenvalue data with a diseased ear rate greater than twenty percent, that is, grade 3 wheat, is inputted as a negative class. A prediction process of each remaining group is similar to the foregoing process, and the same training process is performed.

Implementation Example 3

As the flowering stage of wheat in Jiangsu Province mainly occurs in the middle and last thirds of April, the occurrence of *Fusarium* head blight of wheat is mainly closely related to changes in meteorological factors during the flowering stage. Factors verified in this experiment are similar to those in the past research results of researchers. Air temperature, light intensity, and amounts of evaporation before and after the flowering stage have significant influence on the occurrence of *Fusarium* head blight of wheat. However, because diseased ear rates in different levels are clearly different, it is difficult to apply the method to actual production. A regression analysis method is still highly limited.

Next, when a method of a BP neural network is used to build a model for *Fusarium* head blight of wheat in Anhui Province, the BP neural network has relatively high fault tolerance and an excellent nonlinear mapping capability, and can adequately find internal relationships in sample data. Similarly, a correlation test is first performed on different meteorological factor independent variables and *Fusarium* head blight of wheat. The BP neural network is used to build a model for factors that pass a significance test.

Finally, a method of SVM multiple classification is further used to build a model for *Fusarium* head blight of wheat in Anhui Province, and the SVM can support calculation of a small amount of sample data, so that the disadvantage that a neural network requires a large number of data samples for calculation can be overcome, the processing of a complex nonlinear problem can theoretically avoid local optimum, and the method is more worthy of actual popularization and use.

The foregoing embodiments are merely intended for describing the technical concept of the present invention, but cannot be used to limit the protection scope of the present invention. Any changes made to the technical solutions according to the technical concept of the present invention shall fall within the protection scope of the present invention.

What is claimed is:

1. A handheld monitoring and early warning device for *Fusarium* head blight of in-field wheat, comprising:
    an acquisition card, configured to acquire data;
    a processor, configured to analyze the data acquired by the acquisition card, to obtain a growth and an affection of the in-field wheat based on a deep learning algorithm;
    a camera, configured to acquire root, stem, and ear information of the in-field wheat;
    a touchscreen, being a medium configured to perform a human-computer interaction;
    a power supply, configured to supply power to the handheld monitoring and early warning device; and
    a 4G network card, configured to perform data communication and at the same time communicate with an external cloud server, wherein
    the processor is separately communicatively connected to the camera, the touchscreen, and the acquisition card, and the power supply is separately electrically connected to the camera, the touchscreen, and the acquisition card;
    wherein the acquisition card comprises a microcontroller unit (MCU), a start circuit, a DC-DC step-down module, an environmental monitoring sensor module, a Wi-Fi wireless transmission module, and a 2-way 485 communication interface; wherein the microcontroller unit (MCU), the start circuit, the DC-DC step-down module, the environmental monitoring sensor module, the Wi-Fi wireless transmission module, and the 2-way 485 communication interface are integrated on a circuitry board, wherein
    the environmental monitoring sensor module is connected to the MCU, and is configured to monitor various indicator data in an environment and send the various indicator data to the MCU; and the start circuit and the DC-DC step-down module are both connected to the MCU, the Wi-Fi wireless transmission module is connected to the MCU and implement the data communication between the MCU and the processor, and the 2-way 485 communication interface is connected to the MCU;
    the environmental monitoring sensor module comprises a light sensor, a carbon dioxide sensor, a carbon monoxide sensor, an ozone sensor, a humiture sensor, and a $PM_5$ detection sensor, and output terminals of the light sensor, the carbon dioxide sensor, the carbon monoxide sensor, the ozone sensor, the humiture sensor, and the $PM_5$ detection sensor are all connected to the MCU; and
    the environmental monitoring sensor module further comprises an external soil humiture sensor and a soil pH value sensor, wherein the external soil humiture sensor and the soil pH value sensor are respectively plugged in the 2-way 485 communication interface.

2. The handheld monitoring and early warning device according to claim 1, wherein the processor uses a single-board computer, and the single-board computer is provided with a built-in Wi-Fi module to implement the data communication with the 4G network card.

3. The handheld monitoring and early warning device according to claim 1, wherein the camera uses an integrated industrial camera, and the integrated industrial camera is rotatably connected to the handheld monitoring and early warning device by an adjustable spiral rocker, to implement a 360-degree rotation of the integrated industrial camera; and the integrated industrial camera is adaptively joined to the adjustable spiral rocker by a cylindrical platform to fix a shooting angle of the integrated industrial camera.

4. An early warning method using a handheld monitoring and early warning device for the *Fusarium* head blight of the in-field wheat, wherein the handheld monitoring and early warning device for the *Fusarium* head blight of the in-field wheat comprises:
    an acquisition card, configured to acquire data;
    a processor, configured to analyze the data acquired by the acquisition card, to obtain a growth and an affection of the in-field wheat based on a deep learning algorithm;

a camera, configured to acquire root, stem, and ear information of the in-field wheat;
a touchscreen, being a medium configured to perform a human-computer interaction;
a power supply, configured to supply power to the handheld monitoring and early warning device; and
a 4G network card, configured to perform data communication and at the same time communicate with an external cloud server, wherein
the processor is separately communicatively connected to the camera, the touchscreen, and the acquisition card, and the power supply is separately electrically connected to the camera, the touchscreen, and the acquisition card;
and the method comprises the following steps:
step 1: obtaining historical meteorological data in the last decade of a wheat planting region that requires monitoring and early warning, wherein the historical meteorological data comprise nine meteorological factors: an air temperature, a humidity, a sunshine duration, an amount of evaporation, a 5-cm soil temperature, a 10-cm soil temperature, a soil humiture, a soil pH value, and an air spore count;
step 2: normalizing the nine meteorological factors in step 1 to obtain nine model variables, and uploading and storing the nine model variables in a cloud server;
step 3: acquiring data of 14 days in a row by using the handheld monitoring and early warning device at 12 points randomly selected in every acre of a land in the wheat planting region in the middle and last thirds of April, and shooting wheat ear pictures and at the same time obtaining meteorological data of the 14 days, wherein the meteorological data comprise seven meteorological factors: the air temperature, the humidity, the soil temperature, the soil humidity, the soil pH value, an illumination, and a $PM_5$ count in air;
step 4: uploading data of the wheat ear pictures acquired in step 3 and the meteorological data of the 14 days to the cloud server;
step 5: detecting a number of diseased ears in the wheat ear pictures in the data of the wheat ear pictures in step 4 in the cloud server by using a deep learning target detection algorithm ConerNet, and then calculating a ratio of an affected wheat ear area to an entire ear area by using a deep learning semantic segmentation algorithm U-net, to obtain a diseased ear rate of the *Fusarium* head blight of the in-field wheat, wherein the diseased ear rate of the *Fusarium* head blight of the in-field wheat is used as one model variable;
step 6: normalizing the seven meteorological factors in the meteorological data of the 14 days in step 4 in the cloud server, to obtain seven model variables, and storing the seven model variables in the cloud server;
step 7: respectively establishing three prediction models as three individual learning machines in a parallel Bagging ensemble learning manner by using a multiple regression analysis machine learning algorithm, a BP neural network machine learning algorithm, and a support vector machine (SVM) machine learning algorithm at the same time; then integrating the three prediction models to form a uniform integrated model as a bigram model of an occurrence of the *Fusarium* head blight of the in-field wheat, and outputting whether wheat is affected; and respectively substituting a total of seventeen model variables obtained in step 2, step 5, and step 6 into the three prediction models used as the three individual learning machines in the bigram model, at the same time performing an operation, and eventually obtaining three prediction results through a hyperparameter optimization, wherein each of the three prediction results comprises a level of the diseased ear rate of the *Fusarium* head blight of the in-field wheat and a calculation result accuracy; and
classifying the level of the diseased ear rate of the *Fusarium* head blight of the in-field wheat into four grades by observing sample data, wherein a wheat with the diseased ear rate being zero is classified as grade 0, a wheat with the diseased ear rate between one percent and ten percent is classified as grade 1, a wheat with the diseased ear rate between ten percent and twenty percent is classified as grade 2, and a wheat with the diseased ear rate greater than twenty percent is classified as grade 3; and
step 8: using a result with high accuracy in the same level from the three prediction results obtained in step 7 as an optimal solution.

5. The early warning method according to claim 4, wherein in step 2 and step 6, the meteorological factors are normalized using a normalization formula as follows:

$$\bar{x}^{(j)} = \frac{x^{(j)} - \min^{(j)}}{\max^{(j)} - \min^{(j)}},$$

wherein j is a meteorological factor, $\bar{x}^{(j)}$ is a value corresponding to the meteorological factor j after normalization obtained through the normalization formula, $x^{(j)}$ is a value corresponding to the meteorological factor j in a data set, and $\max^{(j)}$ and $\min^{(j)}$ are respectively a maximum value and a minimum value of the meteorological factor j in the data set.

6. The early warning method according to claim 4, wherein step 3 comprises:
connecting an external soil humiture sensor and a soil pH value sensor to the handheld monitoring and early warning device, and operating the handheld monitoring and early warning device, wherein the handheld and early warning device further comprises an environmental monitoring sensor module, wherein the environmental monitoring sensor module acquires the meteorological data, and the touchscreen displays real-time meteorological data; and
adjusting a shooting angle of a camera, shooting the in-field wheat from top to bottom at a distance of 50 cm from wheat ears, and after the shooting is completed, uploading the wheat ear pictures and the meteorological data to the cloud server via the 4G network card.

7. The early warning method according to claim 4, wherein step 5 comprises:
step 501: marking ears in the wheat ear pictures to obtain marked wheat ear pictures, and randomly grouping the marked wheat ear pictures at a ratio of 75% to 25%, to establish a training set and a data set;
step 502: using the marked wheat ear pictures in step 501 to train the deep learning target detection algorithm ConerNet, to obtain the number of diseased ears in the wheat ear pictures; and
step 503: segmenting and retrieving affected wheat grains in the ears in step 502 by using the deep learning semantic segmentation algorithm U-net, comprising the following steps: first, establishing a training environment; then, changing a training file path, wherein the training file path is a file path for saving the wheat ear pictures; and finally, testing the wheat ear pictures, and calculating a ratio of the affected wheat area area to the entire ear area in every wheat ear picture, to obtain the diseased ear rate of the *Fusarium* head blight of the in-field wheat.

8. The early warning method according to claim 7, wherein the ears in the wheat ear pictures are marked in a total of two marking manners:
   in the first marking manner, a rectangular box is drawn to select all affected wheat ears in a wheat ear picture by using the labelImg software, wherein position information of four corners of the rectangular box in the wheat ear picture after a box selection are saved in a jason format; and
   in the second marking manner, points are selected through clicking to mark the wheat grains in affected ear regions of every wheat plant in the wheat ear picture by using the labelme software, wherein position information of all selection points are saved in the jason format.

9. The early warning method according to claim 5, wherein for the prediction model established by using the SVM machine learning algorithm in step 7, a kernel function in the prediction model uses a Gaussian kernel function, a feature matrix is inputted into an SVM prediction model, an eigenvector matrix is first built for every group of data, the eigenvector matrix is then placed in an SVM for training, wherein
   in primary classification, eigenvalue data with the diseased ear rate less than one percent for normal wheat is inputted as a positive class, and eigenvalue data with the diseased ear rate greater than one percent for diseased wheat is inputted as a negative class, and after the classification is completed, secondary classification is performed;
   in the secondary classification, when the diseased wheat is classified, eigenvalue data with the diseased ear rate between one percent and ten percent for grade 1 wheat is inputted as the positive class, and eigenvalue data with the diseased ear rate greater than ten percent is inputted as the negative class; and
   by analogy, in tertiary classification, eigenvalue data with a diseased ear rate between ten percent and twenty percent for grade 2 wheat is inputted as the positive class, and eigenvalue data with the diseased ear rate greater than twenty percent for grade 3 wheat is inputted as the negative class.

10. The early warning method according to claim 4, wherein the processor uses a single-board computer, and the single-board computer is provided with a built-in Wi-Fi module to implement the data communication with the 4G network card.

11. The early warning method according to claim 4, wherein the acquisition card comprises a microcontroller unit (MCU), a start circuit, a DC-DC step-down module, an environmental monitoring sensor module, a Wi-Fi wireless transmission module, and a 2-way 485 communication interface; wherein the microcontroller unit (MCU), the start circuit, the DC-DC step-down module, the environmental monitoring sensor module, the Wi-Fi wireless transmission module, and the 2-way 485 communication interface are integrated on a circuitry board, wherein
   the environmental monitoring sensor module is connected to the MCU, and is configured to monitor various indicator data in an environment and send the various indicator data to the MCU; and the start circuit and the DC-DC step-down module are both connected to the MCU, the Wi-Fi wireless transmission module is connected to the MCU and implement the data communication between the MCU and the processor, and the 2-way 485 communication interface is connected to the MCU;
   the environmental monitoring sensor module comprises a light sensor, a carbon dioxide sensor, a carbon monoxide sensor, an ozone sensor, a humiture sensor, and a $PM_5$ detection sensor, and output terminals of the light sensor, the carbon dioxide sensor, the carbon monoxide sensor, the ozone sensor, the humiture sensor, and the $PM_5$ detection sensor are all connected to the MCU; and
   the environmental monitoring sensor module further comprises an external soil humiture sensor and a soil pH value sensor, wherein the external soil humiture sensor and the soil pH value sensor are respectively plugged in the 2-way 485 communication interface.

12. The early warning method according to claim 4, wherein the camera uses an integrated industrial camera, and the integrated industrial camera is rotatably connected to the handheld monitoring and early warning device by an adjustable spiral rocker, to implement a 360-degree rotation of the integrated industrial camera; and the integrated industrial camera is adaptively joined to the adjustable spiral rocker by a cylindrical platform to fix a shooting angle of the integrated industrial camera.

* * * * *